(12) United States Patent
Paggi

(10) Patent No.: US 11,519,473 B2
(45) Date of Patent: Dec. 6, 2022

(54) BRAKING BAND OF A DISC FOR A DISC BRAKE OF THE VENTILATED TYPE

(71) Applicant: FRENI BREMBO S.p.A., Curno (IT)

(72) Inventor: Fabrizio Paggi, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 78 days.

(21) Appl. No.: 16/969,587

(22) PCT Filed: Feb. 12, 2019

(86) PCT No.: PCT/IB2019/051113
§ 371 (c)(1),
(2) Date: Aug. 13, 2020

(87) PCT Pub. No.: WO2019/175682
PCT Pub. Date: Sep. 19, 2019

(65) Prior Publication Data
US 2021/0010552 A1 Jan. 14, 2021

(30) Foreign Application Priority Data
Feb. 13, 2018 (IT) .................. 102018000002652

(51) Int. Cl.
*F16D 65/12* (2006.01)
*F16D 65/02* (2006.01)

(52) U.S. Cl.
CPC .... *F16D 65/128* (2013.01); *F16D 2065/1328* (2013.01); *F16D 2065/1344* (2013.01)

(58) Field of Classification Search
CPC ........................................... F16D 65/123–128
(Continued)

(56) References Cited

U.S. PATENT DOCUMENTS 3,983,973 A 10/1976 Zboralski et al.
4,523,666 A 6/1985 Murray
(Continued)

FOREIGN PATENT DOCUMENTS

DE 202015102580 U1 9/2015
EP 0318687 A2 6/1989
(Continued)

OTHER PUBLICATIONS

European Patent Office, International Search Report with Written Opinion, dated May 14, 2019, 15 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A braking band extends between an inner diameter and an outer diameter. The braking band has two plates having inner surfaces delimiting a gap, outer surfaces having opposite flat circumferential portions and a plate body having an extension in axial direction. The plates are joined by connecting elements. At least one plate has at least one projection projecting into the gap without reaching the opposite plate, forming a localized narrowing of the gap and a thickening of the plate body, creating a localized increase of the thickness of plate. The projection extends from a first connecting element to an adjacent connecting element, connecting them, and along the circumferential direction, connecting at least two adjacent connecting elements. A group of projections extends circumferentially along a discontinuous annular path, avoiding a uniform distribution in circumferential direction.

21 Claims, 9 Drawing Sheets

(58) Field of Classification Search
USPC .............. 188/18 A, 218 XL, 264 A, 264 AA
See application file for complete search history.

(56) References Cited

U.S. PATENT DOCUMENTS

| | | | |
|---|---|---|---|
| 4,865,167 A | 9/1989 | Giorgetti et al. | |
| 5,004,078 A | 4/1991 | Oono et al. | |
| 5,542,503 A | 8/1996 | Dunn et al. | |
| 6,131,707 A | 10/2000 | Buechel et al. | |
| 6,145,636 A | 11/2000 | Ikari et al. | |
| 6,325,185 B1 | 12/2001 | Doi et al. | |
| 6,367,599 B2 | 4/2002 | Kobayashi | |
| 7,066,306 B2 | 6/2006 | Gavin | |
| 7,267,210 B2 | 9/2007 | Cornolti et al. | |
| 7,690,484 B2 | 4/2010 | Oberti et al. | |
| 8,668,058 B2 | 3/2014 | Lu et al. | |
| 9,022,182 B2 * | 5/2015 | Cavagna | F16D 65/128 |
| | | | 188/218 XL |
| 9,175,733 B2 | 11/2015 | Chern et al. | |
| 9,255,617 B2 * | 2/2016 | Ronchi | F16D 65/128 |
| 9,371,875 B2 | 6/2016 | Noriega Gonzalez et al. | |
| 9,841,073 B2 | 12/2017 | Noriega Gonzalez et al. | |
| 10,156,275 B2 | 12/2018 | Carminati et al. | |
| 10,738,847 B2 | 8/2020 | Biondo et al. | |
| 2004/0118644 A1 | 6/2004 | Oberti et al. | |
| 2006/0024346 A1 | 2/2006 | Brody et al. | |
| 2008/0067018 A1 | 3/2008 | Smith et al. | |
| 2009/0000884 A1 | 1/2009 | Layton et al. | |
| 2009/0035598 A1 | 2/2009 | Hanna et al. | |
| 2010/0122880 A1 | 5/2010 | Hanna et al. | |
| 2012/0255821 A1 * | 10/2012 | Cavagna | F16D 65/128 |
| | | | 188/218 XL |
| 2019/0063526 A1 * | 2/2019 | Biondo | F16D 65/128 |
| 2020/0300318 A1 | 9/2020 | Biondo et al. | |

FOREIGN PATENT DOCUMENTS

| | | | |
|---|---|---|---|
| EP | 1373751 B1 | 1/2004 | |
| EP | 1696149 B1 | 3/2010 | |
| GB | 2286438 * | 8/1995 | ............ F16D 65/12 |
| GB | 2286438 A | 8/1995 | |
| IT | M1940247 A1 | 8/1995 | |
| WO | WO/02064992 A2 | 8/2002 | |
| WO | WO/2004102028 A1 | 11/2004 | |
| WO | WO/2006105131 A2 | 10/2006 | |
| WO | WO/2011058594 A1 | 5/2011 | |
| WO | WO/2016020820 A1 | 2/2016 | |
| WO | WO/2017153873 A1 | 9/2017 | |
| WO | WO/2017153902 A1 | 9/2017 | |

* cited by examiner

BRAKING BAND OF A DISC FOR A DISC BRAKE OF THE VENTILATED TYPE

FIELD OF THE INVENTION

The present invention relates to a braking band and to a ventilated disc for disc brake, particularly, but not exclusively, for applications in the automobile field.

BACKGROUND ART

The brake caliper in a disc brake is generally arranged straddling the outer peripheral edge of a brake disc, adapted to rotate about a rotation axis (A-A) defining an axial direction (X-X). Moreover, in a disc brake there is defined a radial direction (R-R) which is substantially orthogonal to said axial direction (X-X), and a tangential (C-C) or circumferential direction (C-C), orthogonal both to said axial direction (X-X) and to said radial direction (R-R).

As is known, discs for disc brake comprise a bell adapted to associate the disc with a hub of a vehicle, from which an annular portion extends called a braking band, which is intended to cooperate with pads of a caliper. In the case of discs of the ventilated type, the braking band is made by means of two plates facing and connected to each other by means of connecting elements, respectively, for example in the shape of pillars or fins. The outer surfaces of the two plates define opposite braking surfaces while the inner surfaces, together with the pillars or fins, delimit ventilation channels for cooling the disc, which channels the air flows through according to a centrifugal direction during the rotary motion of the disc itself.

Said braking band is intended to cooperate with disc brake calipers adapted to exert a braking action on the vehicle by exerting, by means of pads, friction on opposite surfaces of the two plates, said braking surfaces.

It is known that during the operation of the brakes, the friction between the brake caliper pads and the braking surfaces of the braking band generates an increased quantity of heat which requires being disposed of.

The heat generated indeed causes several undesired phenomena, such as for example, the deformation of the braking band, the formation of cracks on the braking surfaces or localized transformations of state of the material forming the braking band which in turn result in the deterioration of the braking band itself.

In the applications on high performance motor vehicles with an increased braking efficiency in particular, there is much energy to be disposed of and the aforesaid need to dispose of the heat generated during the braking action is even more felt.

Ventilated discs of the type mentioned above have undergone a continuous evolution over time, in particular concerning the number and shape of the so-called ventilation channels, thus defining the gap formed by the two plates axially facing each other.

Among said known ventilated discs, the so-called "pillar discs" have shown to be particularly efficient in terms of heat disposal performance, i.e. cooling, in which discs the ventilation channels are limited internally by particular column connecting elements, having limited comparable radial and circumferential extension with respect to the axial extension thereof, defined as "pillars" which transversely connect the two plates.

For example, "pillar" ventilated discs are known from EP 1 373 751 B1, in which the pillars geometrically are arranged along three concentric circumferences which are coaxial to the disc and have a different radius, to form three "lines"; if cross-sectioned in a plane which is parallel to the two plates and is median with respect thereto, the pillars have different types of cross sections (for example, "rhomboidal" cross-sectioned pillars in the intermediate and outer lines; "drop-shaped" pillars in the inner line).

Other ventilated discs with "pillar" structures are known for example from WO 2004/102028 and from U.S. Pat. No. 5,542,503.

The so-called "fin" or "wing" discs are known among ventilated discs, in which the ventilation channels are limited internally by particular connecting elements elongated along a prevalent direction, for example directed according to a direction parallel to the radial direction (R-R), or spiral connecting elements, and which transversely connect the two plates.

It is also known that the braking action carried out by the pads against the braking surfaces of the disc generates heat, accordingly an increase of temperature of the disc up to making the disc itself incandescent in the case of particularly burdensome performance. The disc is deformed and the contact between the pads and the braking surfaces deteriorates due to the increased temperature reached by the disc during the braking. Moreover, the friction material of the pads undergoes a kind of vitrification and polluting by the disc material.

It has also been detected that the higher temperature is reached at a middle annular portion of the braking surfaces, i.e. at a middle annular portion of the outer surfaces of the respective plates. Such an area is easily subject to the formation of cracks over the course of the life of the disc.

To obviate the above-disclosed drawbacks, the need in the field is particularly felt on the one hand to increase the efficiency of the dispersion of the heat generated by the braking so as to contain the temperatures reached by the disc during and following the braking, and the need on the other hand to increase the mechanical resistance of these middle portions of the braking band.

Solutions are known from WO 2004/102028 and also from WO 2002/064992, U.S. Pat. Nos. 7,066,306, 7,267, 210, US 2006 0243546, US 2004 0124047, U.S. Pat. Nos. 6,367,599, 5,542,503 and 4,865,167. Although they are satisfactory from various viewpoints, these known solutions do not allow a compromise to be reached between the desired mechanical resistance in the middle annular area of the braking band and the contrasting need to maximize, in the same area, the airflow capable of removing the significant localized increase of temperature caused by the braking action.

However, it is worth noting that ventilated discs of the type mentioned do not in themselves provide a solution to a further problem arising simultaneously to the problem mentioned above and which is to be resolved at the same time, a problem which may affect the disc brakes, in particular the disc brakes with ventilated discs, a problem briefly described hereinbelow.

As is known, during the operation of the brakes, the disc and the braking bands in particular may mechanically vibrate at various frequencies correlated with various vibration manners of the dis itself. Such disc vibrations may result for example from resonances triggered by vibrations of objects mechanically coupled to the disc which are stressed in the braking step should the vibration frequencies of such objects be coincident with or sufficiently close to the vibration frequencies of the disc.

It is also known that the above vibrations cause an audible noise, in particular in the shape of disturbing squealing noises, when the resonance frequencies are in the audible range (for example, between 2 and 9 KHz, with subsequent more or less shrill squealing noises).

Accordingly, the need arises to devise solutions for reducing or eliminating such squealing noises by means of construction contrivances which "move" the vibration frequencies of the disc to different values from the excited ones.

Certain solutions are known for discs with structures which are different from the mentioned "pillar" structures.

For example, IT 1 273 754 has braking bands with projections protruding into the inner part of the plates, towards the gap between the two plates, in particular positions and with masses which were specifically identified in order to reduce the vibrations arising and the subsequent noise.

Other ventilated discs with structures adapted to reduce disturbing vibrating phenomena are known for example, from U.S. Pat. No. 4,523,666.

Document U.S. Pat. No. 3,983,973 of Knorr-Bremse GmbH shows a brake disc comprising a pair of friction plates spaced apart from each other to form a ventilation channel. A braking force may be applied against said plates by means of a braking gasket of brake pads. The two plates are interconnected by a plurality of flow guide ribs or fins so as to define ventilation passages between the friction plates. Strips of anti-vibrating material are positioned in radial grooves formed in the opposite surfaces of the friction plates. These inserts consist of metal elements which damp the vibrations and have a greater expansion coefficient than that of the ferrous material with which the friction plates are made, such as lead, bronze or copper.

A similar solution is known from US2009035598.

It is known from document US2012111692 to couple passive dampers of the Squawk type with the braking device to reduce the vibrations.

From solutions U.S. Pat. No. 6,131,707, WO2016020820, WO2017153902, WO2017153873, EP0318687, WO2011058594, WO2006105131, US2006219500, U.S. Pat. No. 6,145,636, US2010122880, U.S. Pat. Nos. 6,325,185, 5,452,3666, 5,004,078, it is known to provide connections between the braking band plates circumferentially distributed in non-uniform manner in order to reduce the vibrations excited by the braking action.

However, under certain conditions of the braking action, these distributions of the connecting elements of the plates create structural non-uniformities capable of generating completely undesired stresses concentrated in the braking band.

Therefore, the need has arisen for new structures of ventilated discs which simultaneously offer both particular cooling efficiency performance and properties of minimizing the vibrations and noise in the braking step, and while avoiding to cause concentrated stresses in the braking band which could compromise the integrity and duration thereof.

The aforesaid known examples of ventilated discs and related braking bands are not capable of adequately meeting all the strongly desired requirements mentioned.

It is thus the problem at the basis of the present invention to devise a braking band and a disc for disc brake, which have structural and functional features such as to meet the aforesaid needs while obviating the drawbacks mentioned with reference to the known art.

SOLUTION

It is object of the present invention to provide a braking device in which the tendency to create these waves and subsequent squealing noises is reduced.

This and other objects and advantages are achieved by a braking band, a disc of disc brake, and a vehicle as described and claimed herein.

Advantageous embodiments are also described.

An analysis of this solution has shown how the solution proposed allows a much greater braking comfort to be achieved with respect to the solutions of the prior art, therefore a reduction of the vibrations and an absence of vibrations in particular resulting in squealing noises.

Moreover, the solution proposed maintains a cooling efficiency of the disc which is very high and even improved in certain embodiments; for example, the efficiency is greatly improved due to the increased turbulence of the flow of air which flows through the gap of the braking band, turbulence caused by the specific shape of the projections in the plate(s) and arranged between the connecting elements and extending in circumferential direction.

DRAWINGS

Further features and advantages of the device, the disc brake and the vehicle will become apparent from the description provided below of preferred embodiments thereof, given by way of non-limiting examples, with reference to the accompanying drawings, in which.

DESCRIPTION OF SOME PREFERRED EMBODIMENTS

Figure 1:
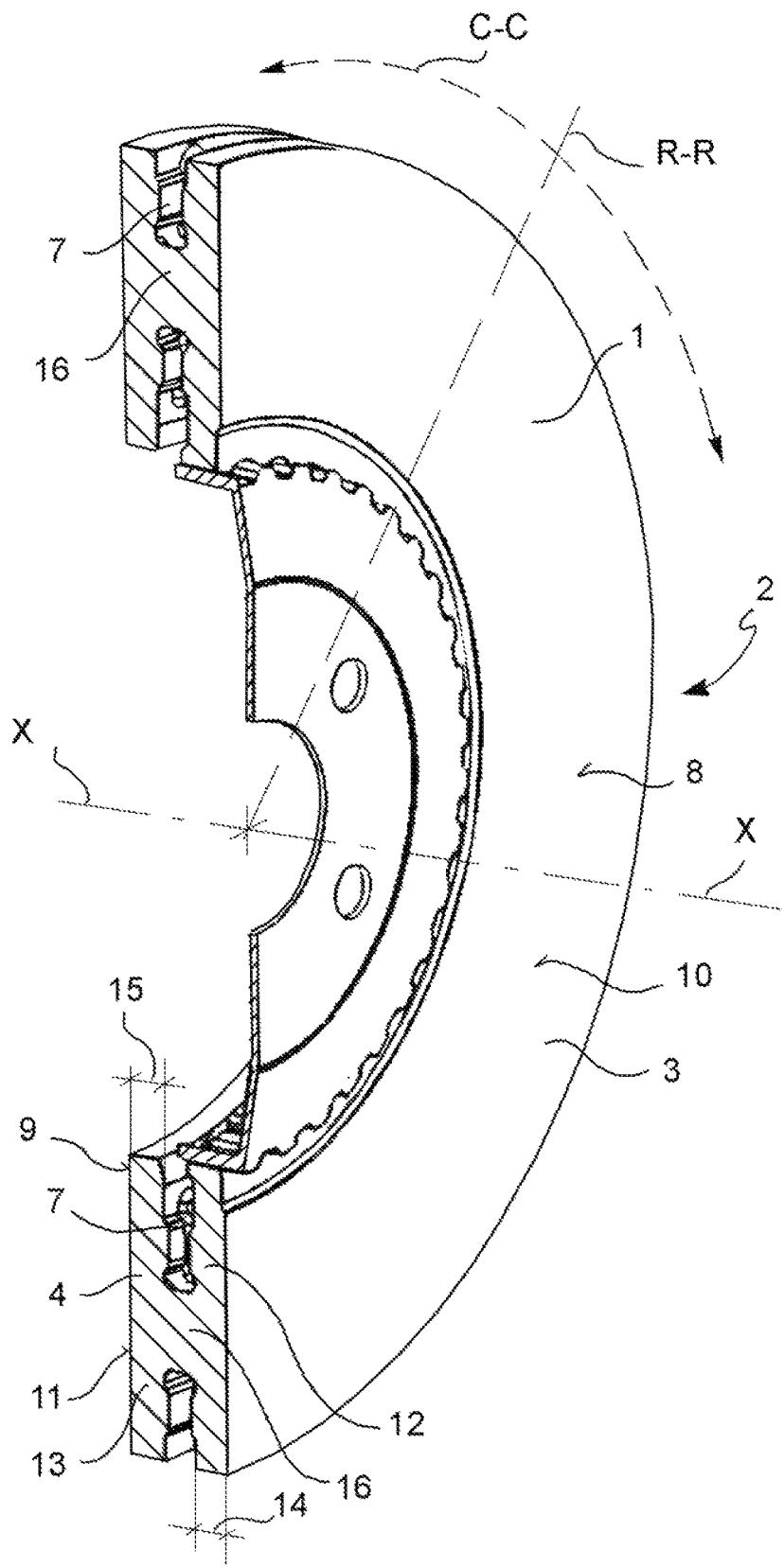
FIG. 1 depicts an axonometric view of a disc of disc brake according to the present invention, partially cross-sectioned along a plane passing through the axial and radial directions.
Figure 2:
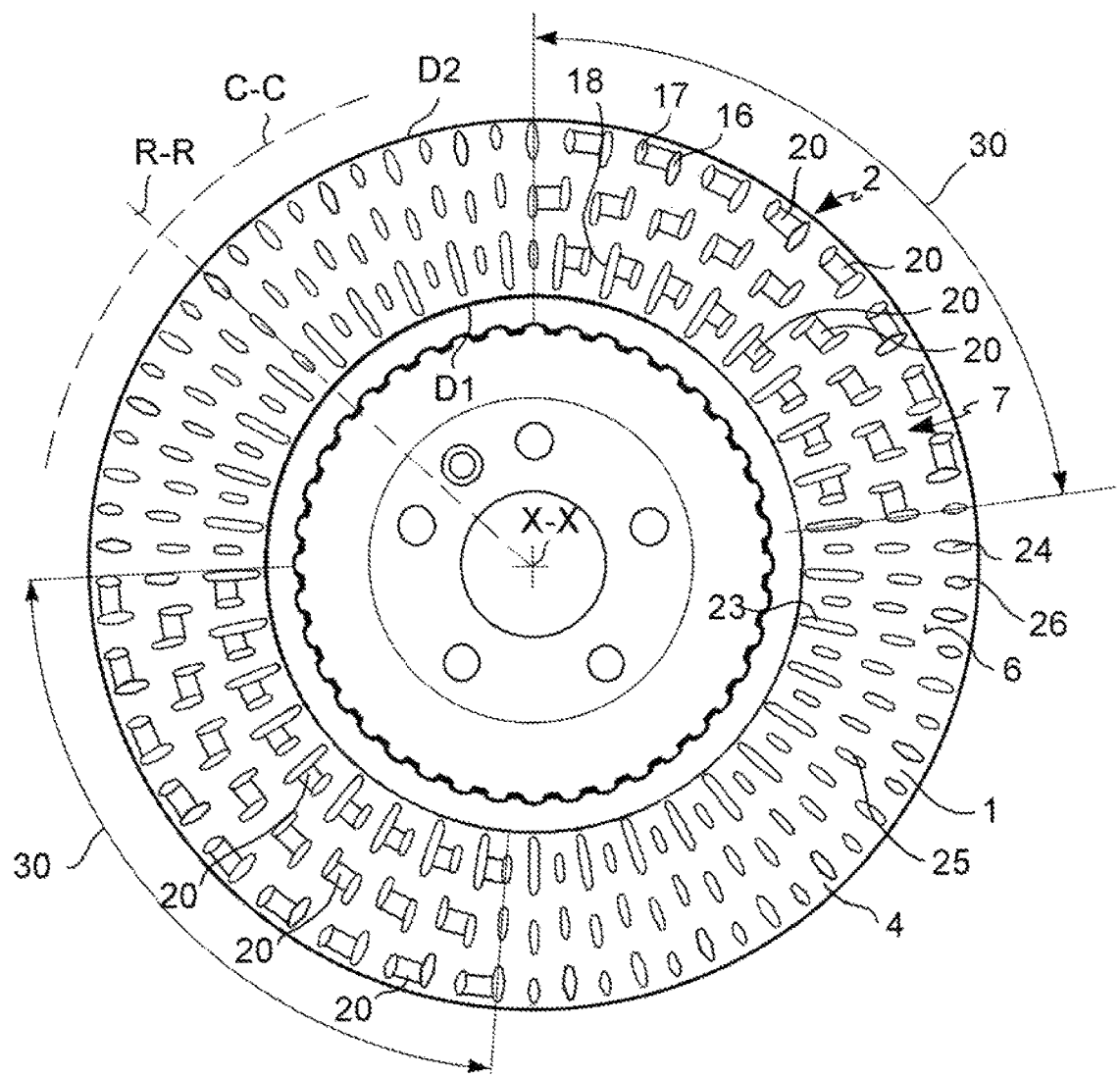
FIG. 2 shows a plan view of the disc in FIG. 1, cross-sectioned along an average flow plane of the fluid flowing through the gap.
Figure 3:
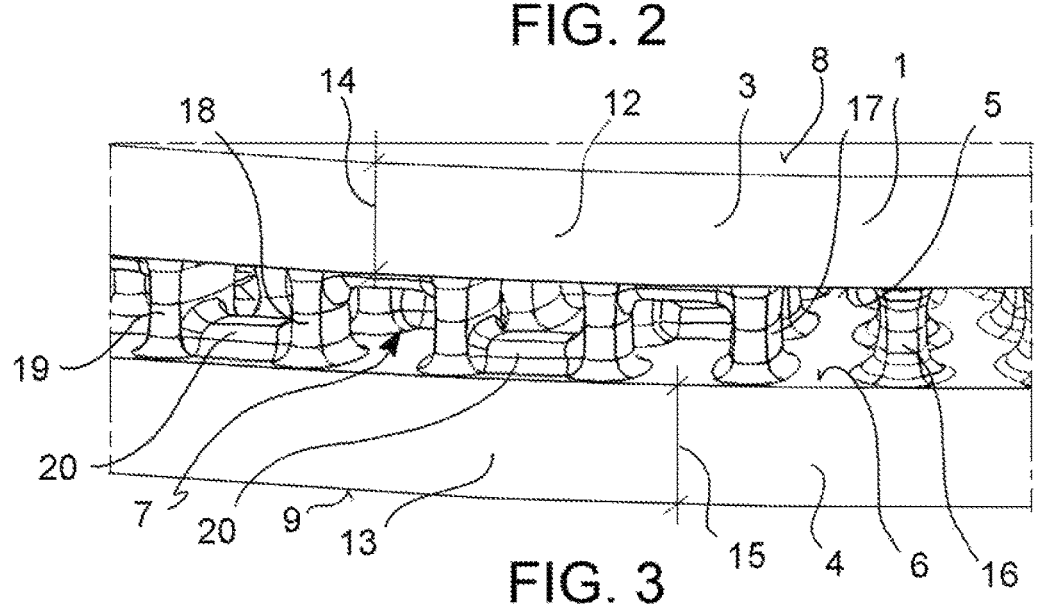
FIG. 3 depicts an axonometric view of a detail of the outer edge of the disc in FIG. 1, from the radial direction towards the inside of the disc.
Figure 4:
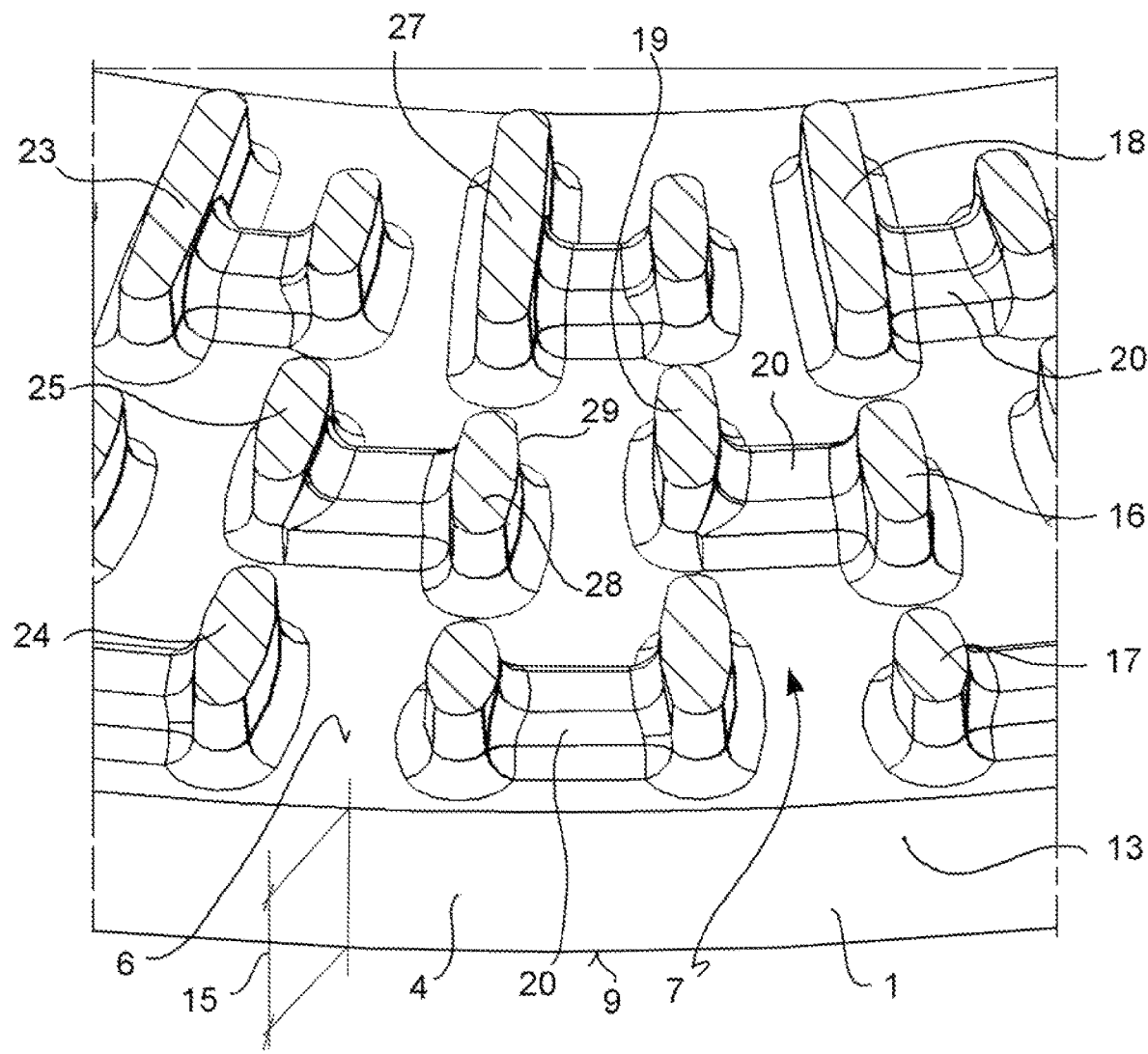
FIG. 4 shows an axonometric view of a detail of the section in FIG. 2.
Figure 5:
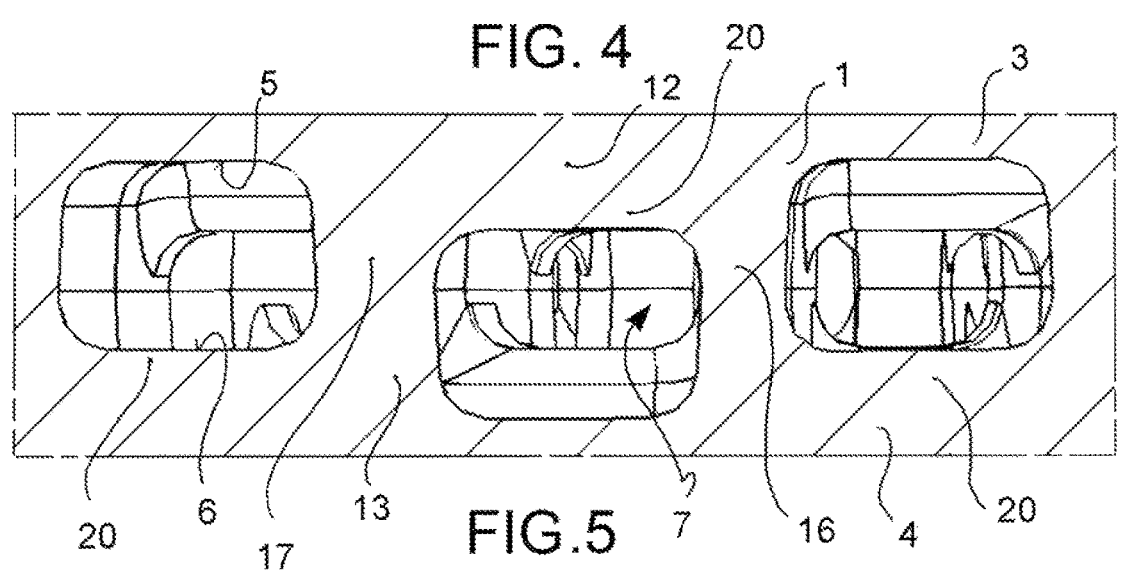
FIG. 5 depicts a side view of the edge in FIG. 3, along the radial direction.
Figure 6:
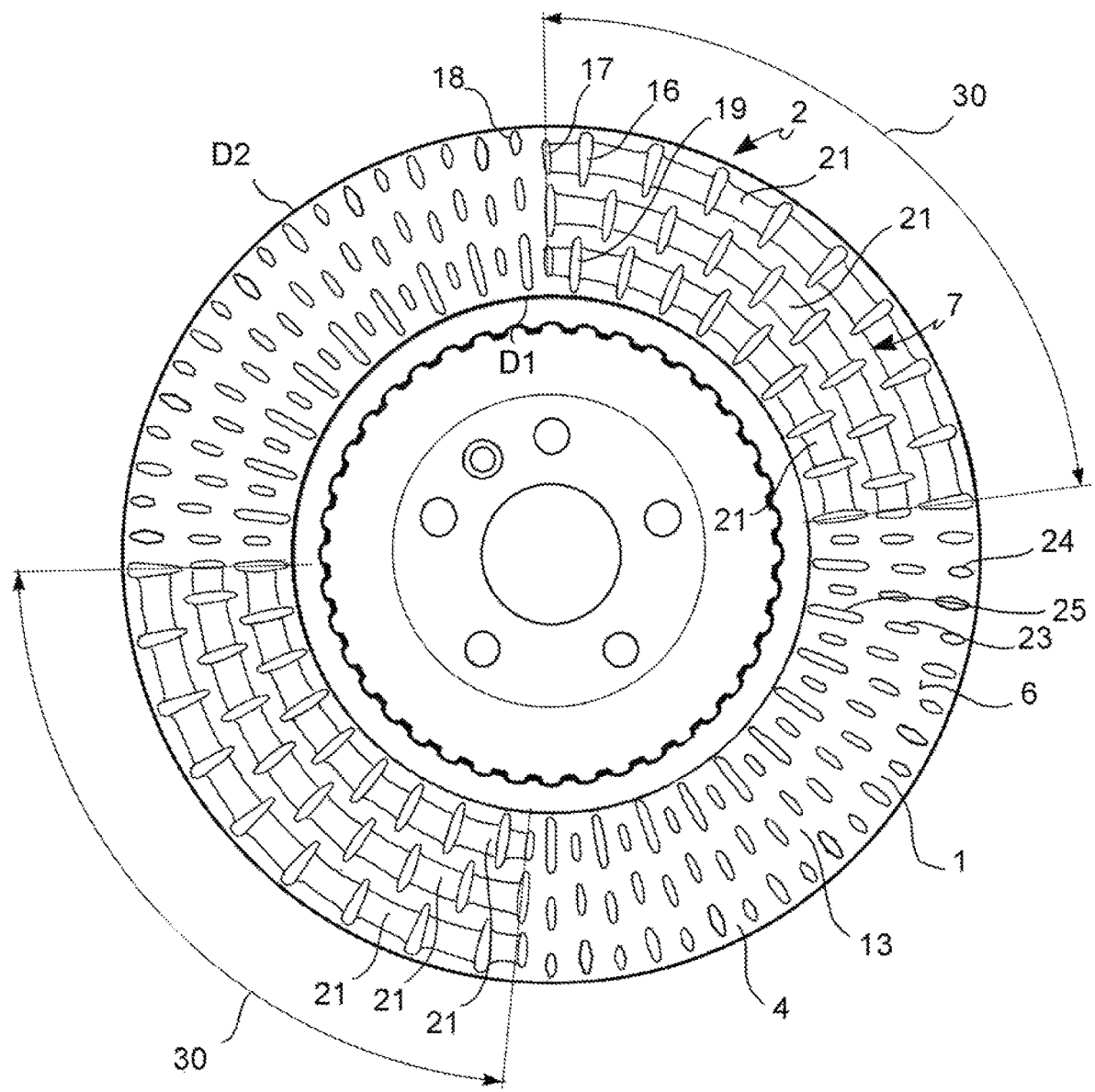
FIG. 6 shows a plan view of a disc according to a further embodiment, cross-sectioned along an average flow plane of the fluid flowing through the gap.
Figure 7:
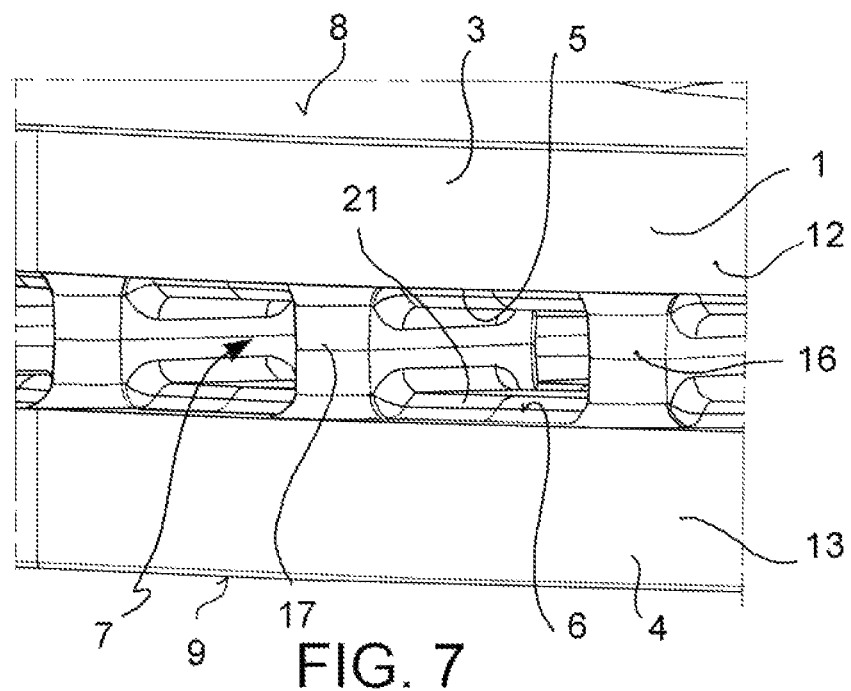
FIG. 7 depicts an axonometric view of a detail of the outer edge of the disc in FIG. 6, from the radial direction towards the inside of the disc.
Figure 8:
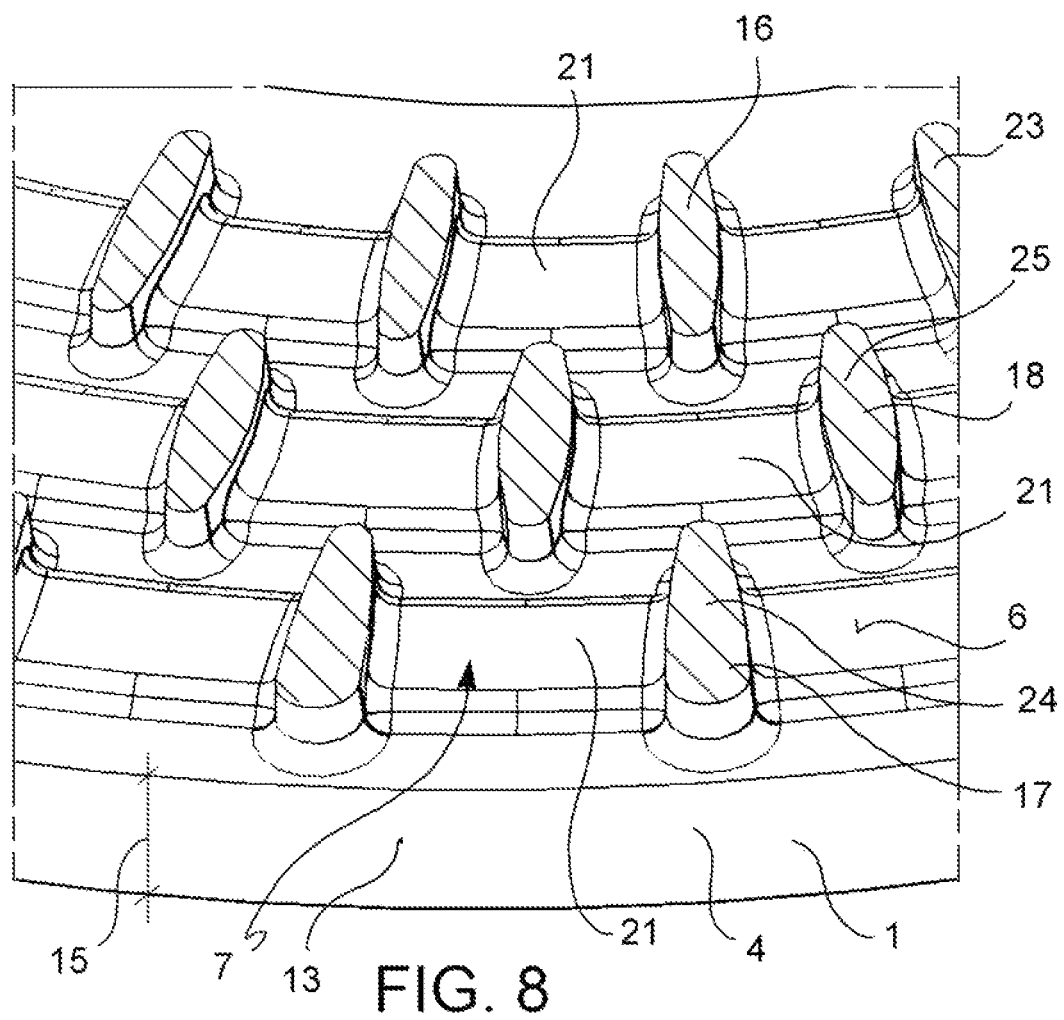
FIG. 8 shows an axonometric view of a detail of the section in FIG. 6.
Figure 9:
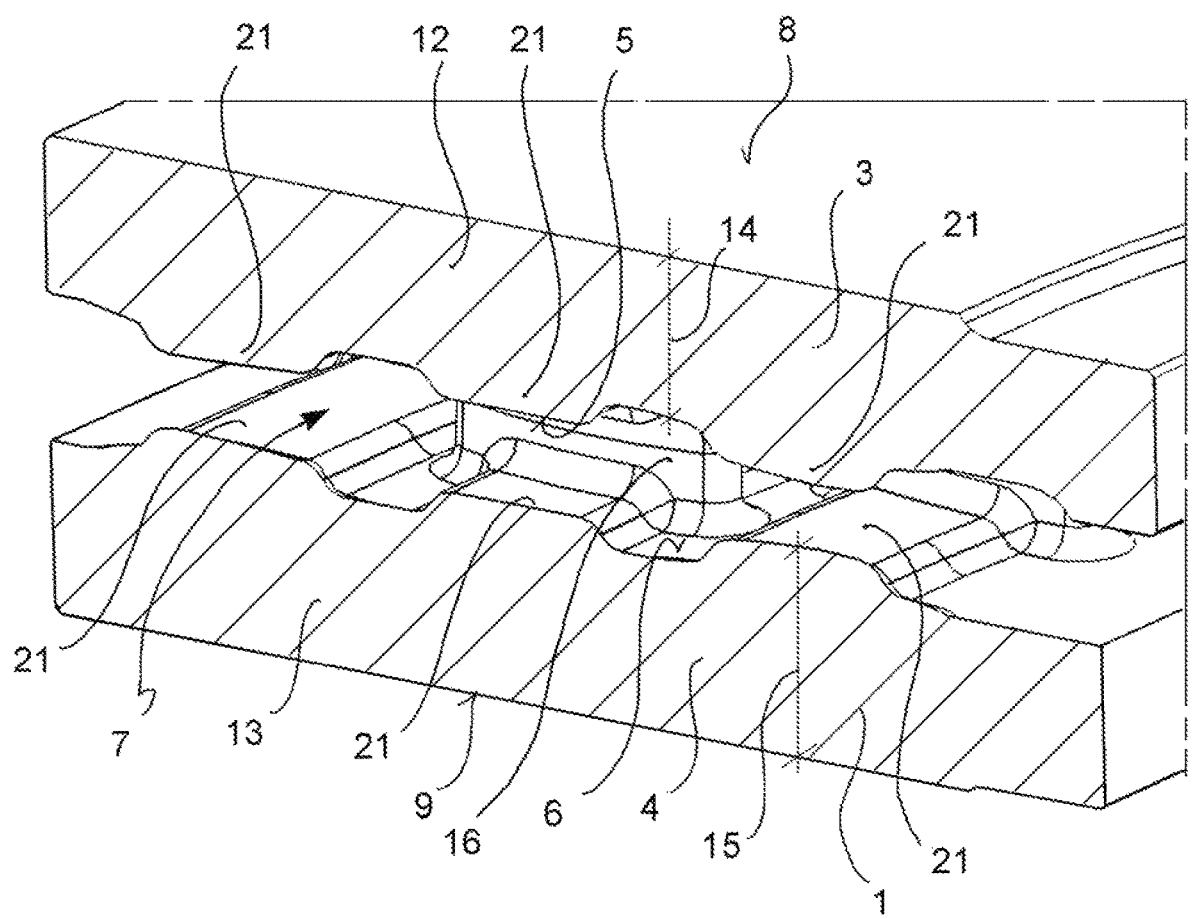
FIG. 9 depicts an axonometric view of a detail of the disc in FIG. 6, partially cross-sectioned along a plane passing through an axial and radial direction.
Figure 10:
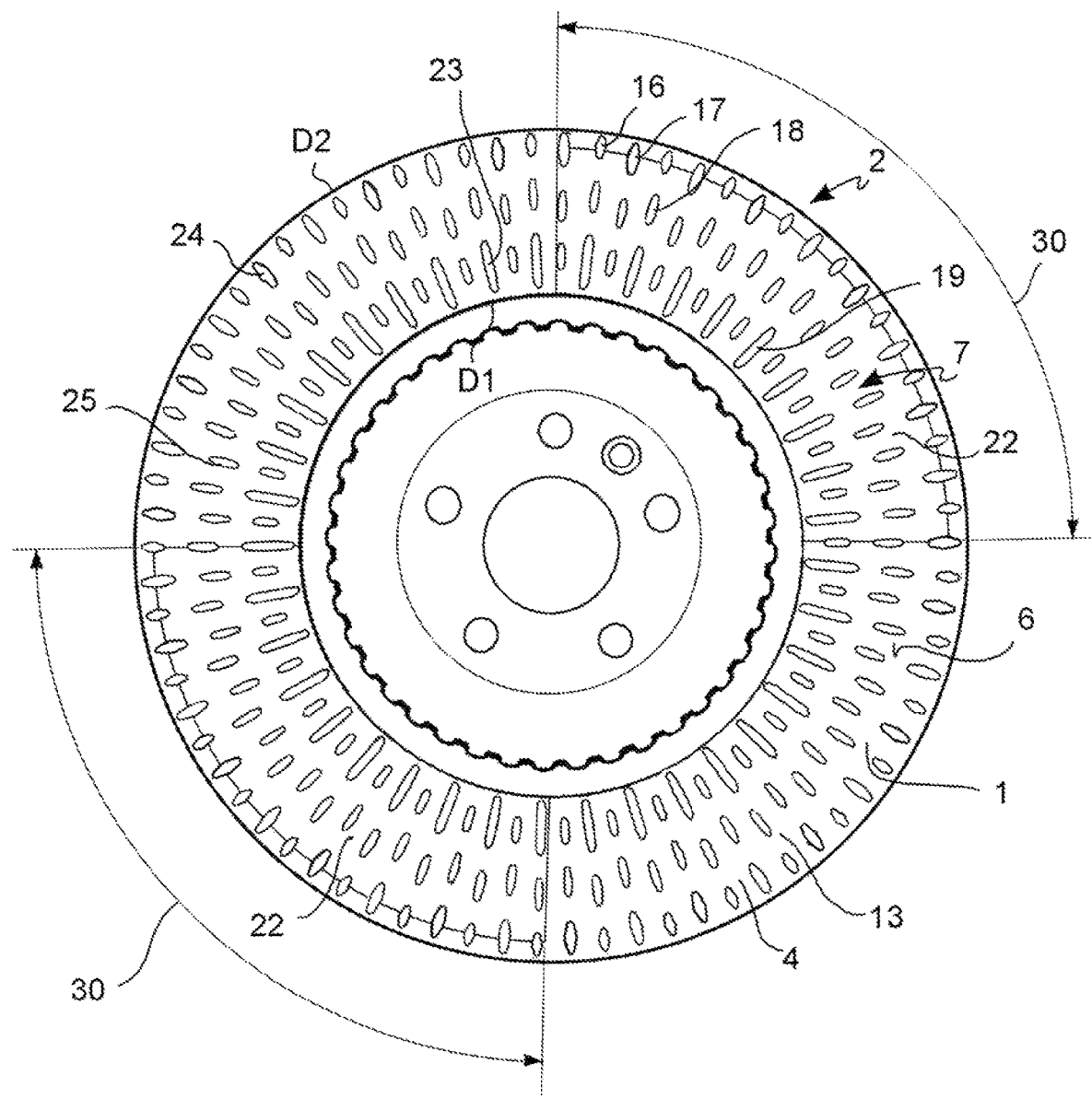
FIG. 10 shows a plan view of a disc according to a further embodiment again, cross-sectioned along an average flow plane of the fluid flowing through the gap.
Figure 11:
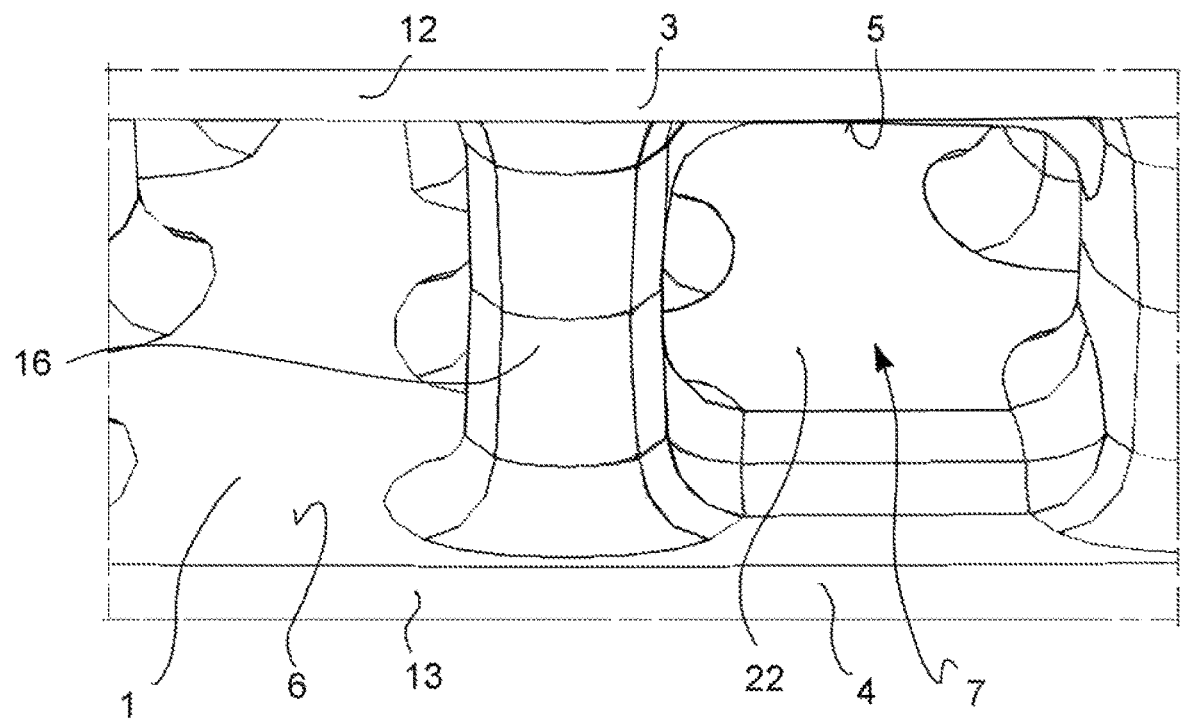
FIG. 11 depicts an axonometric view of a detail of the outer edge of the disc in FIG. 10, from the radial direction towards the inside of the disc.
Figure 12:
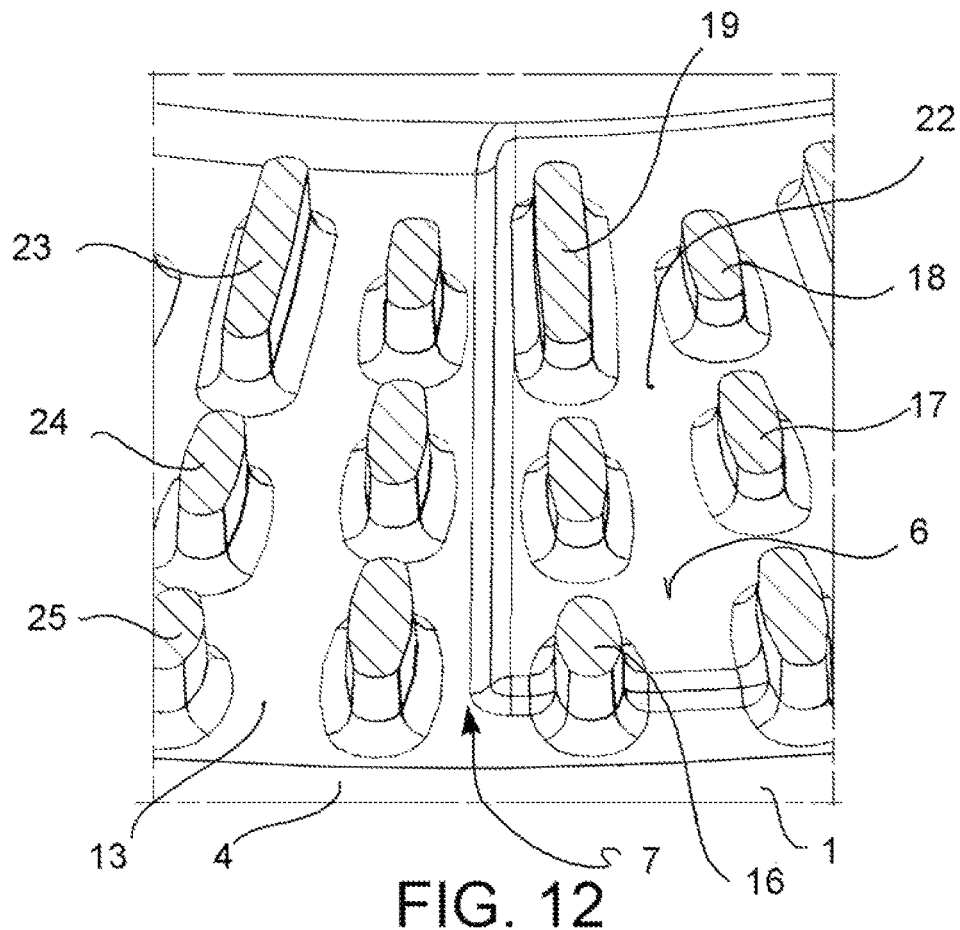
FIG. 12 shows an axonometric view of a detail of the section in FIG. 10.
Figure 13:
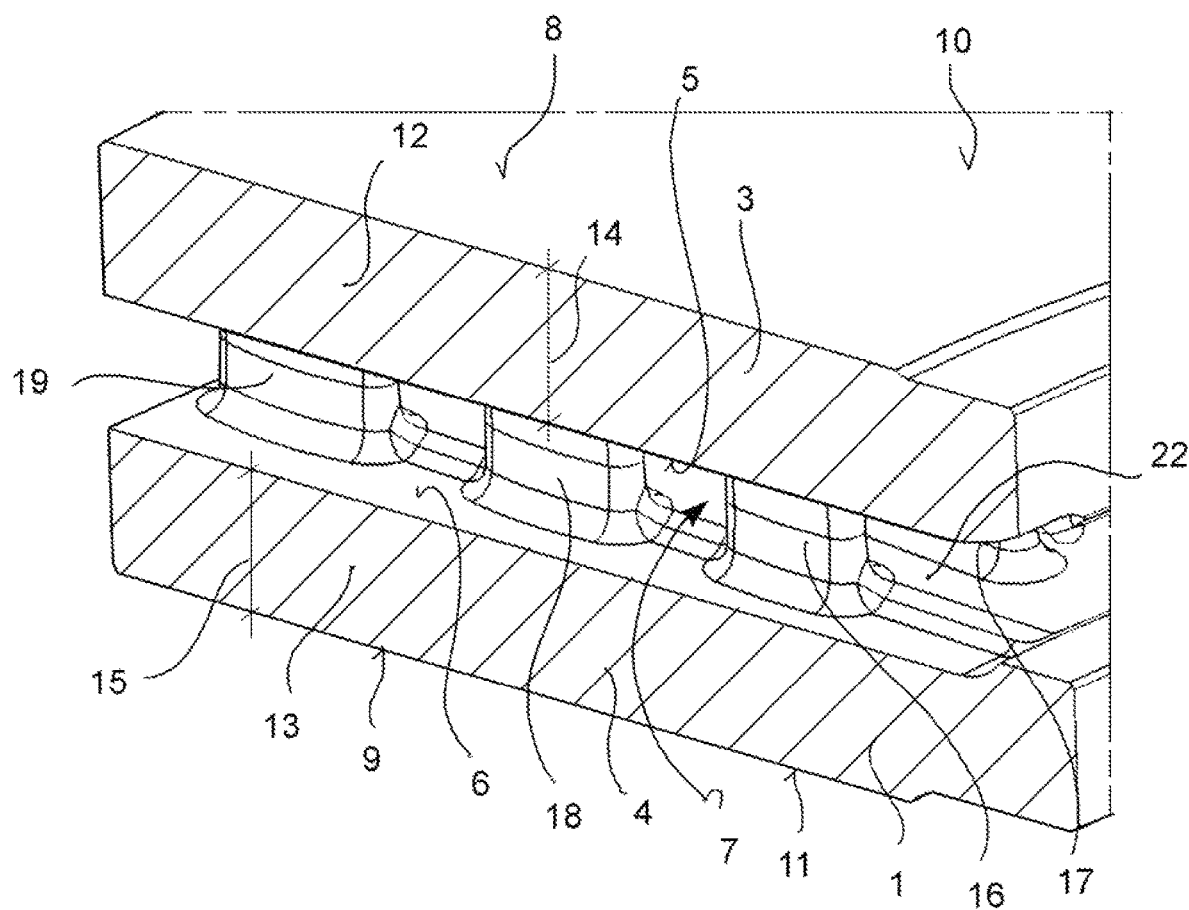
FIG. 13 depicts an axonometric view of a detail of the disc in FIG. 10, partially cross-sectioned along a plane passing through an axial and radial direction.

According to a general embodiment, a braking band 1 of a disc for disc brake 2 of the ventilated type is provided.

Said braking band 1 extends between an inner diameter D1, close to a rotation axis X-X of the braking band 1, and an outer diameter D2, far from said rotation axis X-X. Said rotation axis defines an axial direction X-X.

Said braking band 1 defines a radial direction R-R substantially orthogonal to said axial direction X-X, and a circumferential direction C-C orthogonal both to said axial direction X-X and to said radial direction R-R.

Said braking band 1 comprises two plates 3, 4 facing each other.

Said plates 3, 4 comprise inner surfaces 5, 6 directly or indirectly facing each other and delimiting a gap 7 which defines a ventilation duct for the braking band 1.

Said plates 3, 4 comprise outer surfaces 8, 9.

Said outer surfaces 8, 9 comprise opposite flat circumferential portions which form braking surfaces 10, 11. In other words, portions of the outer surfaces 8, 9 cooperate with brake pads housed in a brake caliper to exert a braking action when sandwiched against the braking band 1. The portion of the outer surfaces 8, 9 which is brushed or involved by the pads defines the braking surfaces 10, 11.

Said plates 3, 4 comprise a plate body 12, 13 having an extension in axial direction X-X or thickness of plate 14, 15. In other words, when assessed in axial direction, each plate 3, 4 shows a thickness of plate 14, 15 which is given by the thickness in axial direction of the plate body 12 of plate 3, 4.

Said plates 3, 4 are joined to each other by heat dissipation elements or connecting elements 16, 17, 18, 19 of the plates 3, 4.

Said connecting elements 16, 17, 18, 19 are shaped as columns and/or ribs protruding from one plate towards the opposite plate in the shape of connecting bridges of the plates 3, 4.

Advantageously, at least one of the plates 3; 4 comprises at least one projection 20, 21, 22 projecting from said plate 3; 4 into said gap 7 without reaching the opposite plate 4; 3.

Said projection 20, 21, 22 forms at least one localized narrowing of said gap 7. In other words, travelling said gap 7, when said projection 20, 21, 22 is reached, a reduction is encountered of the section in axial direction X-X of the size of gap 7.

Said projection 20, 21, 22 forms at least a thickening of the plate body 12; 13, thus creating a localized increase of said thickness of plate 14; 15. In other words, considering the thickness of the body of a plate in axial direction X-X, thickness 14, 15 increases at said projection 20, 21, 22.

Said at least one projection 20, 21, 22 extends at least from a first connecting element 16, 17, 18, 19 to an adjacent connecting element 16, 17, 18, 19, thus connecting said connecting elements 16, 17, 18, 19 to one another.

Said at least one projection 20, 21, 22 extends at least along said circumferential direction (C-C) connecting at least two adjacent connecting elements 16, 17, 18, 19 placed side-by-side in circumferential direction C-C.

The group of each projection 20, 21, 22 extends circumferentially along a discontinuous annular path, avoiding a uniform distribution of the projections in circumferential direction.

According to one embodiment, the group of each projection 20, 21, 22 extends circumferentially along discontinuous circular sectors, avoiding a closed annular path.

According to one embodiment, said connecting elements 16, 17, 18, 19 are grouped into at least two rows or lines 23, 24, 25 arranged circumferentially.

A first of said lines 23 is internally arranged in radial direction or towards said axis X-X close to said inner diameter D1.

A second of said lines 24 is arranged outermost radially far from said axis X-X close to said outer diameter D2.

At least a third of said lines 24 is radially arranged between said first inner line 23 and said second outer line 24.

According to one embodiment, at least two of said connecting elements 16, 17, 18, 19 are pillars 26 which have a circular-shaped section in a plane substantially parallel to the airflow along gap 7 or ventilation channels.

According to one embodiment, at least two of said connecting elements 16, 17, 18, 19 are fins 27 or ribs which have an elongated-shaped section, for example in radial direction R-R, in a plane substantially parallel to the airflow along gap 7 or ventilation channels.

According to one embodiment, at least two of said connecting elements 16, 17, 18, 19 have a rhombus or diamond-shaped section with four vertexes 28 joined by four sides 29 in a plane substantially parallel to the airflow along gap 7 or ventilation channels, in which said sides delimiting said section are substantially rectilinear-shaped.

According to one embodiment, said at least one projection 20, 21, 22 projects into said gap 7 from only one of said plates 3; 4.

According to one embodiment, said at least one projection 20, 21, 22 is at least two projections 20, 21, 22 and said at least two projections 20, 21, 22 project into said gap 7 from both said plates 3, 4.

According to one embodiment, said at least one projection 20, 21, 22 is at least two projections 20, 21, 22 and said at least two projections 20, 21, 22 project into said gap 7 from both said plates 3, 4 and face each other.

According to one embodiment, said at least one projection 20, 21, 22 is at least two projections 20, 21, 22 and said at least two projections 20, 21, 22 project into said gap 7 from both said plates 3, 4 and are at least partially offset from each other. In other words, no part, or only a portion, of a first projection 20, 21, 22 of a first plate 3;4 faces a second projection arranged in the facing plate 4;3 in axial direction X-X.

According to one embodiment, said at least one projection 20, 21, 22 is a plurality of projections 20, 21, 22 which connect two-by-two the connecting elements 16, 17, 18, 19 of at least one circular sector 30.

According to one embodiment, said at least one projection 20, 21, 22 is a plurality of projections 20, 21, 22 which connect two-by-two the connecting elements 16, 17, 18, 19 of non-adjacent circular sectors 30.

According to one embodiment, said at least one projection 20, 21, 22 is a plurality of projections 20, 21, 22 which connect two-by-two the connecting elements 16, 17, 18, 19 of a plurality of non-adjacent circular sectors 30.

According to one embodiment, the group of said projections 20, 21, 22 extends circumferentially C-C along a discontinuous annular path, for example along an arc of the circumference of the braking band 1.

According to one embodiment, the group of said projections 20, 21, 22 extends circumferentially C-C for a plurality of non-adjacent arcs of the circumference of the braking band 1.

According to one embodiment, the group of said projections 20, 21, 22 extends circumferentially C-C for $1/10$ (one tenth) of the circumference of the braking band 1.

According to one embodiment, the group of said projections 20, 21, 22 extends circumferentially C-C for a plurality of non-adjacent stretches each extending 1/10 of the circumference of the braking band 1.

According to one embodiment, the group of said projections 20, 21, 22 extends circumferentially C-C for 1/8 (one eighth) of the circumference of the braking band 1, or extends circumferentially C-C for a plurality of non-adjacent stretches each extending 1/8 of the circumference of the braking band 1.

According to one embodiment, the group of said projections 20, 21, 22 extends circumferentially C-C for 1/6 (one sixth) of the circumference of the braking band 1, or extends circumferentially C-C for a plurality of non-adjacent stretches each extending 1/6 of the circumference of the braking band 1.

According to one embodiment, the group of said projections 20, 21, 22 extends circumferentially C-C for 1/4 (one quarter) of the circumference of the braking band 1, or extends circumferentially C-C for a plurality of non-adjacent stretches each extending 1/4 of the circumference of the braking band 1.

According to one embodiment, the group of said projections 20, 21, 22 extends circumferentially C-C for an even number of non-adjacent stretches.

According to one embodiment, the group of said projections 20, 21, 22 extends circumferentially C-C for an odd number of non-adjacent stretches.

According to one embodiment, said at least one projection 20, 21, 22 is a single piece without discontinuity, or in a single piece, which extends for a circular sector 30 and from the proximity of the inner band diameter D1 to the proximity of the outer band diameter D2.

According to one embodiment, said at least one projection 20, 21, 22 is at least a plurality of circumferentially non-adjacent projections, each being a single projection which extends for a circular sector 30 and from the proximity of the inner band diameter D1 to the proximity of the outer band diameter D2.

According to one embodiment, said at least one projection 20, 21, 22 is at least a plurality of projections which connect the connecting elements 16, 17, 18, 19 of a same line 23; 24; 25.

According to one embodiment, said at least one projection 20, 21, 22 is at least a plurality of projections which connect the connecting elements 16, 17, 18, 19 of a same line 23; 24; 25, which considered as a whole, extend limited to a circular sector.

According to one embodiment, said at least one projection 20, 21, 22 is at least a plurality of projections which connect the connecting elements 16, 17, 18, 19 of a same line 23; 24; 25, which considered as a whole, extend limited to a plurality of circumferentially non-adjacent circular sectors.

According to one embodiment, said at least one projection 20, 21, 22 connects all the connecting elements 16, 17, 18, 19 of all the lines 23; 24; 25, which considered as a whole, extend limited to a circular sector.

According to one embodiment, said at least one projection 20, 21, 22 connects all the connecting elements 16, 17, 18, 19 of all the lines 23; 24; 25, which considered as a whole, extend limited to a plurality of circumferentially non-adjacent circular sectors.

The present invention also relates to a disc of disc brake comprising a braking band 1 according to any one of the embodiments described above.

The present invention also relates to a vehicle comprising a braking band 1 according to any one of the embodiments described above.

Those skilled in the art may make many changes, adaptations and replacements to the embodiments described above or can replace elements with others which are functionally equivalent in order to meet contingent needs without however departing from the scope of the appended claims.

The group of projections 20, 21, 22 arranged close to one another forms a group of projections 20, 21, 22 which is arranged circumferentially, thus creating a circumferential distribution having circumferential discontinuities capable of creating a non-uniform distribution of the group of projections, a distribution adapted to avoid the presence of modes of vibration of the braking band 1 which, if driven into resonance, create disturbing noises or squealing noises.

LIST OF REFERENCES

1 braking band
2 disc of disc brake
3 plate
4 plate
5 inner surface
6 inner surface
7 gap
8 outer surface
9 outer surface
10 braking surface
11 braking surface
12 plate body
13 plate body
14 plate thickness
15 plate thickness
16 connecting elements
17 connecting elements
18 connecting elements
19 connecting elements
20 projection
21 projection
22 projection
23 lines
24 lines
25 lines
26 pillars
27 fins or ribs
28 rhombus or diamond with four vertexes
29 rhombus sides
30 circular sector
X-X rotation axis and axial direction
R-R radial direction
C-C tangential direction
D1 inner band diameter
D2 outer band diameter

The invention claimed is:

1. A braking band of a disc for a disc brake of ventilated type,
    the braking band extending between an inner band diameter, close to a rotation axis (X-X) of the braking band, and an outer band diameter, far from the rotation axis (X-X), said rotation axis defining an axial direction (X-X);
    the braking band defining a radial direction (R-R) orthogonal to the axial direction (X-X), and a circumferential direction (C-C) orthogonal both to the axial direction (X-X) and to the radial direction (R-R);
    the braking band comprising two plates facing each other;
    said two plates comprising inner surfaces directly or indirectly facing each other and delimiting a gap;
    said two plates further comprising outer surfaces;

said outer surfaces comprising opposite flat circumferential portions forming braking surfaces;
said two plates further comprising a plate body having an extension in axial direction (X-X) or thickness of plate;
said two plates being joined to each other by heat dissipation elements or connecting elements;
said connecting elements being shaped as columns and/or ribs protruding from one plate towards the opposite plate in shape of connecting bridges of the plates;
wherein
at least one plate of the two plates comprises at least one projection projecting from said at least one plate into said gap without reaching an opposite plate, forming at least one localized narrowing of said gap and a thickening of the plate body, creating a localized increase of said thickness of plate; and wherein
said at least one projection extends at least from a first connecting element to an adjacent connecting element, connecting said connecting elements; and wherein
said at least one projection extends at least along said circumferential direction (C-C) connecting at least two adjacent connecting elements placed side-by-side in circumferential direction (C-C); and wherein
a group of projections extends circumferentially along a discontinuous annular path, avoiding a uniform distribution in circumferential direction;
wherein the group of projections extends circumferentially along discontinuous circular sectors, avoiding a closed annular path;
wherein a discontinuous circular sector of projections and connection elements is circumferentially bounded by discontinuous circular sectors of only connection elements.

2. The braking band of claim 1, wherein:
the connecting elements are grouped into at least two rows or lines arranged circumferentially; and wherein
a first inner line of said at least two rows or lines is internally arranged in radial direction or towards said rotation axis (X-X) close to said inner band diameter; and wherein
a second outer line of said at least two rows or lines is arranged outermost radially far from said rotation axis (X-X) close to said outer band diameter; and wherein
at least a third line is radially arranged between said first inner line and said second outer line; and wherein
at least two of said connecting elements are pillars having a circular-shaped section in a plane parallel to airflow along the gap; and wherein
said at least one projection is at least a plurality of projections which connect the connecting elements of a same line; or wherein
said at least one projection is at least a plurality of projections which connect the connecting elements of a same line limited to a circular sector; or wherein
said at least one projection is at least a plurality of projections which connect the connecting elements of a same line limited to a plurality of circumferentially non-adjacent circular sectors; or wherein
said at least one projection connects all connecting elements of all lines limited to a circular sector; or wherein
said at least one projection connects all connecting elements of all lines limited to a plurality of circumferentially non-adjacent circular sectors.

3. The braking band of claim 1, wherein at least two of said connecting elements are tabs or ribs having an elongated-shaped section in a plane parallel to airflow along the gap, including in the radial direction (R-R).

4. The braking band of claim 1, wherein at least two of said connecting elements have a rhombus or diamond-shaped section with four vertexes joined by four sides in a plane substantially parallel to airflow along the gap, wherein said sides delimiting said section are rectilinear-shaped.

5. The braking band of claim 1, wherein said at least one projection projects into said gap from only one of said two plates.

6. The braking band of claim 1, wherein said at least one projection is at least two projections and said at least two projections project into said gap from both plates.

7. The braking band of claim 1, wherein said at least one projection is at least two projections and said at least two projections project into said gap from both plates and are facing each other.

8. The braking band of claim 1, said at least one projection is at least two projections and said at least two projections project into said gap from both plates and are at least partially offset from each other.

9. The braking band of claim 1, wherein:
said at least one projection is at least a plurality of projections, each projection connecting two adjacent connecting elements of at least one circular sector.

10. The braking band of claim 1, wherein the group of projections extends circumferentially (C-C) along an annular discontinuous path, including an arc of a circumference of the braking band, or it extends circumferentially (C-C) along a plurality of non-adjacent arcs of the circumference the braking band.

11. The braking band of claim 1, wherein the group of projections extends circumferentially (C-C) for 1/10 of the circumference of the braking band, or it extends circumferentially (C-C) for a plurality of non-adjacent stretches, each stretch extending 1/10 of the circumference of the braking band.

12. The braking band of claim 1, wherein the group of projections extends circumferentially (C-C) for 1/8 of the circumference of the braking band, or it extends circumferentially (C-C) for a plurality of non-adjacent stretches, each stretch extending 1/8 of the circumference of the braking band.

13. The braking band of claim 1, wherein the group of projections extends circumferentially (C-C) for 1/6 of the circumference of the braking band, or it extends circumferentially (C-C) for a plurality of non-adjacent stretches, each stretch extending 1/6 of the circumference of the braking band.

14. The braking band of claim 1, wherein the group of projections extends circumferentially (C-C) for 1/4 of the circumference of the braking band, or it extends circumferentially (C-C) for a plurality of non-adjacent stretches, each stretch extending 1/4 of the circumference of the braking band.

15. The braking band of claim 1, wherein the group of projections extends circumferentially (C-C) for an even number of non-adjacent stretches.

16. The braking band of claim 1, wherein the group of projections extends circumferentially (C-C) for an odd number of non-adjacent stretches.

17. The braking band of claim 1, wherein:
said at least one projection is a single projection extending for a circular sector and from proximity of the inner band diameter to proximity of the outer band diameter; or wherein
said at least one projection is at least a plurality of circumferentially non-adjacent projections, each being a single projection extending for a circular sector and from proximity of the inner band diameter to proximity of the outer band diameter.

18. A disc of a disc brake comprising a braking band according to claim 1.

19. A vehicle comprising a braking band according to claim 1.

20. The braking band of claim 1, wherein a first discontinuous circular sector of projections and connection elements is radially opposite a second discontinuous circular sector of projections and connection elements, wherein said first and second discontinuous circular sectors are separated by discontinuous circular sectors of only connection elements.

21. The braking band of claim 1 wherein said discontinuous circular sector of projections and connection elements and said discontinuous circular sectors of only connection elements are adapted to dissipate vibration modes in the braking band.

\* \* \* \* \*